United States Patent [19]

Knauer et al.

[11] Patent Number: 5,027,312
[45] Date of Patent: Jun. 25, 1991

[54] CARRY-SELECT ADDER

[75] Inventors: Karl Knauer, Grafing; Winfried Kamp, Munich, both of Fed. Rep. of Germany

[73] Assignee: Siemens Aktiengellschaaft, Munich, Fed. Rep. of Germany

[21] Appl. No.: 380,601

[22] Filed: Jul. 17, 1989

[30] Foreign Application Priority Data

Jul. 29, 1988 [DE] Fed. Rep. of Germany ....... 3825969

[51] Int. Cl.⁵ .................................................. G06F 7/50
[52] U.S. Cl. .................................................... 364/788
[58] Field of Search ........................................ 364/788

[56] References Cited

U.S. PATENT DOCUMENTS

| | | | |
|---|---|---|---|
| 3,100,835 | 8/1963 | Bedrij | 364/788 |
| 4,573,137 | 2/1986 | Ohhashi | 364/788 |
| 4,623,982 | 11/1986 | Ware | 364/788 |
| 4,682,303 | 7/1987 | Uya | 364/788 |
| 4,704,701 | 11/1987 | Mazin et al. | 364/788 |

Primary Examiner—David H. Malzahn
Attorney, Agent, or Firm—Hill, Van Santen, Steadman & Simpson

[57] ABSTRACT

A carry-select adder composed of blocks, each containing an input adder cell and a number of adder cells of a first and second type. Each block has one input adder cell interconnected to adder cells of the first and second type which are connected in an alternating fashion. The cells are connected to each other via carry lines and block carry lines. The adder cells of the first and second type each have a gate arrangement which utilizes field effect transistors for transfer, pull-up and pull-down transistors. These transistors are not a component part of a combination gate within an adder cell. The gate arrangement significantly increases the processing speed of the carry-select adder.

11 Claims, 2 Drawing Sheets

CARRY-SELECT ADDER

BACKGROUND OF THE INVENTION

1. Field of the Invention

The present invention relates to a carry-select adder having adder cells divided into blocks.

2. Description of the Prior Art

Adders are required in many digital logic circuits, such as, digital filters, signal processors and microprocessors. A method for producing an adder is the "ripple-carry" method, wherein a carry output is serially transmitted from an adder cell for a least significant bit to an adder cell for a higher-order bit. The running time of the carry signal will essentially define the addition time.

Another method for producing an adder is the "carry-select" method, in which the adder cells are combined in blocks in an adder and contain double carry paths. Each carry path is used for an assumed carry signal of "0" or "1" at the input side of an adder cell. The carry path to be selected during subsequent data transmissions is decided by a block carry signal, formed from the two individual carry signals of the preceding stage of the block and from the block carry signal of the preceding stage. As a result, the individual carry signals in each block are independent of the carry signal of preceding blocks.

At least two different types of adder cells are required for constructing a "carry-select" adder. One type, an input adder cell is arranged at the beginning of a block, and the input adder cell is followed by an arbitrary number of cells of a second type. Blocks having a higher order in the "carry-select" adder contain a greater number of variable inputs and sum outputs than blocks of lower order. Each individual adder cell in the blocks contains two variable inputs, two carry inputs and outputs, one block carry input and output and a sum output. The number of variable inputs and sum outputs in every block should be selected so that the running time of an individual carry signal through a block corresponds to the sum of the running time of the block carry signals up to this block. In the first stage of a block, the block carry signal is formed from the two carry signals and block carry signal of the last stage of the preceding block. At the input stage of each block, the individual carry signals depend solely on the variable inputs, where the carry inputs can be selectively set to a "high" or a "low" level. The carry signals in a "carry-select" adder pass through each block in parallel by means of two carry paths, where in all adder cells one carry path assumes a low carry signal of "0" at the input of the block, and a second carry path assumes a high carry signal of "1" at the block input. The carry signals in the adder cells depend on the input signals at the variable inputs of the adder cells and on the carry signals at the carry inputs of the adder cells.

German Patent Application EPA-224656 discloses an accelerated run time for the carry signals in an adder circuit. The carry signals are accelerated by alternating connections between adder cells having inverted carry inputs and non-inverted carry outputs alternatively connected with adder cells having non-inverted carry inputs and inverted carry outputs.

German Patent Application DE 33 23 607 discloses a fast adder/subtractor according to the "carry-select" principle. An adder or subtractor having a plurality of stages where the stages are divided into groups that are equipped with two transmission lines. The transmission lines operate with assumed carry levels of "0" or "1" at the input in the least significant stages of the individual groups.

The above referenced adder circuits are disadvantageous due to their excessively slow processing speed.

SUMMARY OF THE INVENTION

The object of the invention is to provide an adder circuit based on the "carry-select" principle that exhibits a high processing speed.

In addition to its high processing speed, the invention includes a simple structure having three different adder cells. An input adder cell and a defined plurality of first and second adder cells or adder cells of a first and second type are interconnected to form a block.

In accordance with the present invention, the carry-select adder is composed, of blocks, each having a group of adder cells. Each block has one input adder cell and a plurality of first and second adder cells having first and second system carry inputs and a system block carry input. These first and second adder cells are connected in alternating fashion and are further connected to the input adder cell.

Each adder cell has two inputs, two carry inputs, two carry outputs, a block carry input, a block carry output and a sum output. The first adder cells invert their carry inputs while the second adder cells invert their carry outputs.

In each block, the two carry outputs of an nth adder cell are connected to the two carry inputs of the following block. The block carry output of each block is connected to the block carry input of each succeeding block. The first and second inputs and the two carry inputs of the input block are variable inputs for the block. Sum outputs of the cells form the sum outputs for the block.

Each adder cell of the first type has a gate arrangement which has two field effect transistors, one acting as a pull-up transistor and the other acting as a pull-down transistor. Two series circuits are formed which each have an inverter gate and a transfer transistor. Each of the carry outputs will have a capacitance as a result of the gate arrangement.

Each adder cell of the second type has a gate arrangement which has two field effect transistors, one acting as a pull-up transistor and the other acting as a pull-down transistor. Two transfer transistors also act as pull-up and pull-down transistors, respectively. The carry outputs at the adder cell of the second type have a capacitance as a result of the gate arrangement.

The invention shall be set forth in greater detail below with reference to an exemplary embodiment shown in the drawing.

DETAILED DESCRIPTION OF THE PREFERRED EMBODIMENTS

Figure 1:
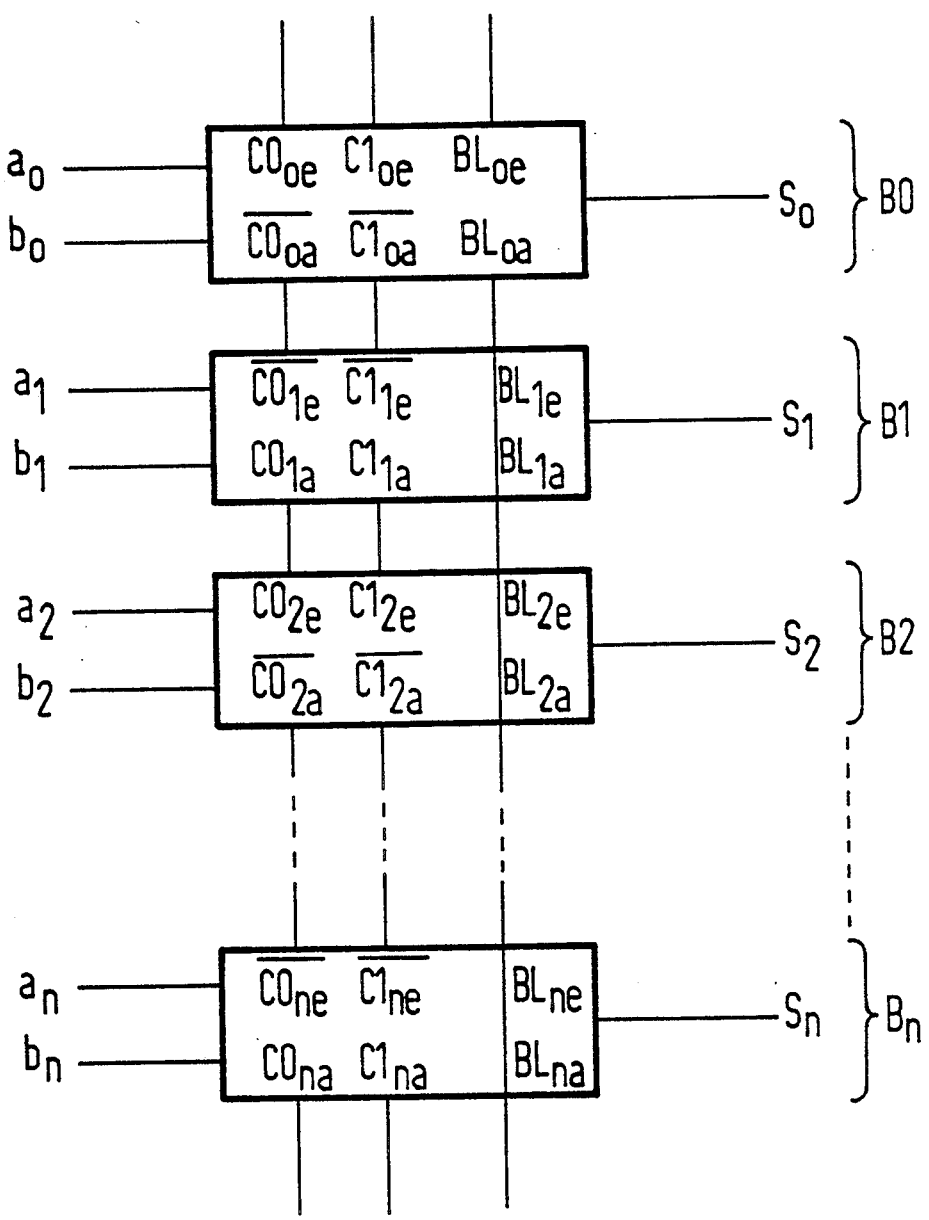
FIG. 1 is a block diagram showing the interconnection of the individual adder cells to form a "carry-select" adder block.

FIG. 1 shows a carry-select adder block having adder cells B0, B1, B2 . . . Bn, whereby the adder cells B0, B1, B2 represent the first three adder cells of a block. For constructing a carry-select adder, an arbitrary number of adder blocks are connected in series, whereby the number of adder cells that are combined to form a block increases with increasing order of the adder blocks. Each of the adder cells contains two variable inputs $a_0$, $b_0$; $a_1$, $b_1$, $a_2$, $b_2$; . . . $a_n$, $b_n$; one block carry input $BL_{0e}$, $BL_{1e}$, $BL_{2e}$, . . . $BL_{ne}$; one block carry output $BL_{0a}$, $BL_{1a}$, $BL_{2a}$ . . . $BL_{na}$, one sum output $S_0$, $S_1$, $S_2$, . . . $S_n$, a first and second carry input $C0_{0e}$, $C1_{0e}$, $C0_{1e}$; $C1_{1e}$; $C0_{2e}$, $C1_{2e}$; . . . $C0_{ne}$, $C1_{ne}$; and a first and second carry output $C0_{0a}$, $C1_{0a}$; $C0_{1a}$, $C1_{1a}$; $C0_{2a}$, $C1_{2a}$; . . . $C0_{na}$, $C1_{na}$. Each block is composed of an input adder cell B0 as well as adder cells of a first and second type, whereby the adder cells of the first and second type are interconnected in an alternating fashion with one another in a block. The first and second carry input $C0_{0e}$, $C1_{0e}$ and the block carry input $BL_{0e}$ of the input adder cell B0 of the first block are applied to a fixed "low" level "0" for an addition in order to prescribe fixed initial conditions for the execution of the addition in the carry-select adder. The inverted first and second carry outputs $C0_{0a}$, $C1_{0a}$ of an input adder cell B0 are connected to the first and second inverted carry input $C0_{1e}$, $C1_{1e}$ of an adder cell of the first type B1, respectively. First and second non-inverted carry outputs $C0_{1a}$, $C1_{1a}$ of the adder cells of the first type are connected to the first and second non-inverted carry input $C0_{2e}$, $C1_{2e}$ of an adder cell of the second type B2, respectively; the block carry output $BL_{0a}$ of the input adder cell B0 is further connected to the block carry input $BL_{1e}$ of the adder cell of the first type B1 and the block carry output $BL_{1a}$ of the adder cell of the first type B1 is connected to the block carry input $BL_{2e}$ of the adder cell of the second type B2. The remaining adder cells within a block are of the first type and second type, are arranged in alternating fashion, and are analogously connected to one another with their carry inputs and outputs as well as with their block carry inputs and outputs. The last adder cell Bn is of the first type and forms the termination of a block for the carry-select adder and, in addition to the variable inputs $a_n$, $b_n$ and the sum output $S_n$ containing the two inverted carry inputs $C0_{ne}$, $C1_{ne}$, there are two non-inverted carry outputs $C0_{na}$, $C1_{na}$, and block carry input and output $BL_{ne}$, $BL_{na}$, respectively.

As may be seen from FIG. 1, the block carry signal for the adder block is formed in the input adder cell B0 and is forwarded through the remaining adder cells of the adder block. An evaluation of the block carry signal and carry signals of the preceding adder block ensues in the input adder cell to form a new block carry signal. The carry signals of the input adder cell B0 of an adder block will be forwarded into the next succeeding adder cell of the first type B1. The first and second, inverted carry out $C0_{0a}$ and $C1_{0a}$ are thereby dependent only on the variable inputs $a_0$, $b_0$ and are not dependent on the carry signals at the first and second carry input $C0_{oe}$, $C1_{0e}$. For the remaining adder cells of the first and second type in an adder block B1 and B2, respectively, the carry signals at the inverted carry inputs of B1 ($C0_{1e}$, $C1_{1e}$) and the non-inverted carry inputs of B2 ($C0_{2e}$, $C1_{2e}$) are to be taken into consideration for the carry signals at the non-inverted carry outputs of B1 ($C0_{1a}$, C11a) and the inverted carry outputs of B2 ($C0_{2a}$, $C1_{2a}$). The alternating arrangement of adder cells of the first and second type B1, B2 of the FIG. 1 serves the purpose of accelerating the carry signals in the carry paths of the individual adder cells and will thus increase the processing speed of the carry-select adder.

Figure 2:
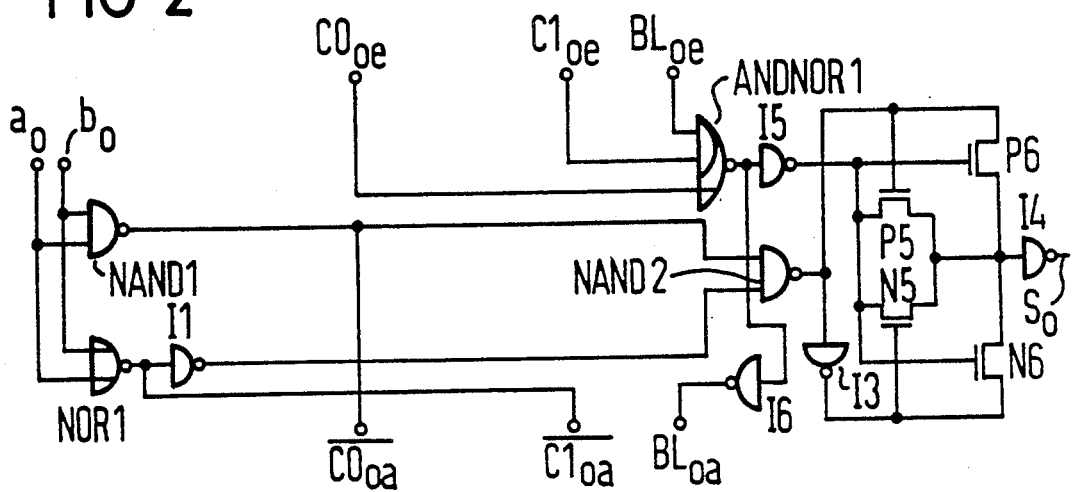
FIG. 2 is a circuit diagram of an input adder cell in FIG. 1.

FIG. 2 shows the block circuit diagram of an input adder cell which is the type present at the start of every block in the carry-select adder. The input adder cell contains two NAND gates NAND1, NAND2, five inverters I1, I3, I4, I5 and I6, a NOR gate NOR1, an ANDNOR gate ANDNOR1, two p-channel field effect transistors P5, P6, as well as n-channel field effect transistors N5 and N6.

The first variable input $a_0$ is interconnected to a first input of the first NAND gate NAND1 and to a first input of a NOR gate NOR1 and the second variable input $b_0$ is interconnected to a second input of the first NAND gate NAND1 and to a second input of the NOR gate NOR1. The output of the first NAND gate NAND1 forms the first inverted carry output $C0_{0a}$ and is also connected to the first input of the second NAND gate NAND2, whereas the output of the NOR gate NOR1 represents the second inverted carry output $C1_{0a}$ and is connected via a first inverter I1 to the second terminal of the second NAND gate NAND2. The first carry input $C0_{0e}$ is connected on to the NOR input of the ANDNOR gate ANDNOR1 and the second carry input $C1_{0e}$ as well as the block carry input $BL_{0e}$ are respectively connected on to an AND input of the ANDNOR gate ANDNOR1; the output of the ANDNOR gate ANDNOR1 forms the block carry output $BL_{0a}$ of the input adder cell via a second inverter I6. The output of the ANDNOR gate ANDNOR1 is interconnected via a third inverter I5 to the gate of a first p-channel field effect transistor P6 and to the gate of a first n-channel field effect transistor N6 as well as to a first terminal of a second p-channel field effect transistor P5 and to a first terminal of a second n-channel field effect transistor N5. The output of the second NAND gate NAND2 is interconnected, first, to a first terminal of the first p-channel field effect transistor P6 and, via a fourth inverter I3, to the gate of the second n-channel field effect transistor N5 and to the first terminal of the first n-channel field effect transistor N6. The second terminal of the first and second n-channel field effect transistors N6, N5 and the second terminal of the first and second p-channel field effect transistors P6, P5 are connected in common to an input of a fifth inverter I4, whose output is the sum output $S_0$ of the input adder cell.

Figure 3:
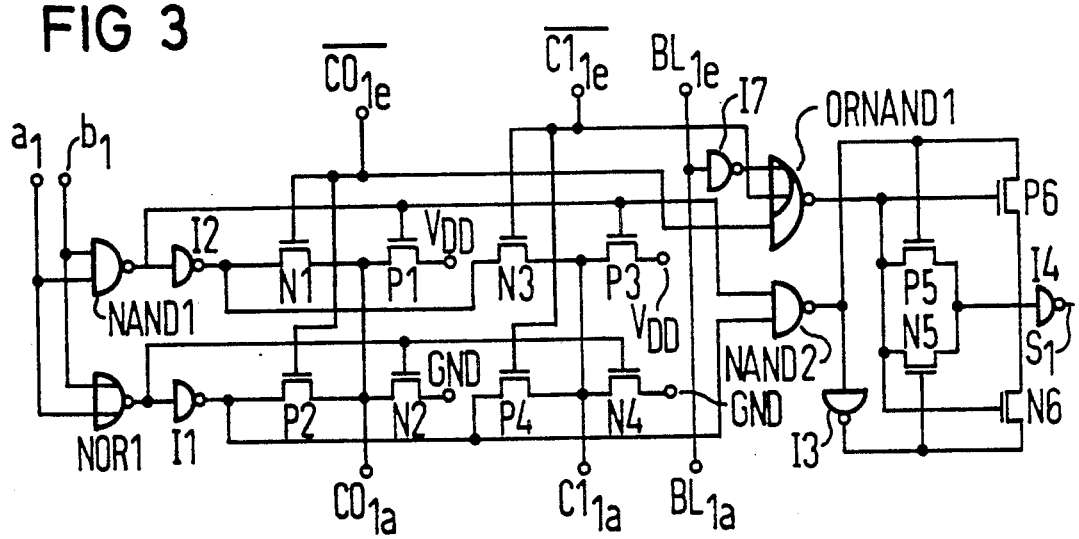
FIG. 3 is a circuit diagram of an adder cell of the first type in FIG. 1.

FIG. 3 shows a block circuit diagram of an adder cell of the first type which comprises a gate arrangement having two variables for evaluating a first and second carry input signal, for sum formation and for carry formation, whereby one variable input is provided for one of the two variables. The gate arrangement of the adder cell of the first type is fashioned such that the charging of the capacitor of the first and second, non-inverted carry outputs $C0_{1a}$, $C1_{1a}$ occurs via two field effect transistors P1, P2 acting as pull-up, respectively. Pull-down transistors P1, P2 for the first, non-inverted carry output $C0_{1a}$ or P3, P4 for the second, non-inverted carry output $C1_{1a}$ form two series circuits for the first and second, non-inverted carry output $C0_{1a}$, $C1_{1a}$. Each of these series circuits contains an inverter gate I1, A2 and a further transfer transistor N1, P2 for the first non-inverted carry output $C0_{1a}$ and N3, N4 for the second non-inverted carry out $C1_{1a}$.

The adder cell of the first type is partially constructed with components identical to those used for the input adder cell of FIG. 2, so that identical reference characters are employed in FIG. 3 and in FIG. 2. The adder cell of the first type is composed of two NAND gates NAND1, NAND2, five inverters I1, I2, I3, I4, I7, and NOR gate NOR1, and ORNAND gate ORNAND1, six n-channel field effect transistors N1, N2, N3, N4, N5, N6, and six p-channel field effect transistor P1, P2, P3, P4, P5, P6. The p-channel field effect transistors P1, P3 are utilized as pull-up transistors, the n-channel field effect transistors N2, N4 are utilized as pull-down transistors and the remaining field effect transistors are utilized as transfer transistors. The first variable input $a_1$ of the adder cell of the first type is connected to the first input of the first NAND gate NAND1 and to the first input of the NOR gate NOR1; and the second variable input $b_1$ is interconnected to the second input of the first NAND gate NAND1 and to the second input of the NOR gate NOR1. The output of the first NAND gate NAND1 is connected via a first inverter I2 to the first terminal of a first n-channel transfer transistor N1 and to the first terminal of a second n-channel transfer transistor N3, whereby the first inverter I2, the first n-channel transfer transistor N1, the second n-channel transfer transistor N3, and the first inverter I2 each form a series circuit. The output of the first NAND gate NAND1 is also connected to a first input of a second NAND gate NAND2 and to the gate terminal of the first and second pull-up transistors P1, P3. The output of the NOR gate NOR1 is connected via a second inverter I1 to the first terminal of a first and second p-channel transfer transistor P2, P4, respectively. The output of the second inverter I1 is connected to a second input of the second NAND gate NAND2 and the output of the NOR gate NOR1 is connected to the gate terminal of a first and second pull-down transistors N2, N4. The first terminal of the first and second pull-down transistors N2, N4 is connected to the ground GND. The first terminal of the first and second pull-up transistors P1, P3 is interconnected to the supply voltage $V_{DD}$. The first inverted carry input $C0_{1e}$ is connected to the gate terminals of the first n-channel transfer transistor N1 and the first p-channel transistor P2 and to an AND input of the ORNAND gate ORNAND1. The second inverted carry input $C1_{1e}$ is interconnected to the gate terminals of the second n-channel transfer transistor N3 and the second p-channel transfer transistor P4 as well as to a first OR input of the ORNAND gate ORNAND1. The structure of the first adder cell of the first type according to FIG. 3 further provides that the first non-inverted carry output $C0_{1a}$ is connected to the second terminal of the first n-channel transfer transistor N1, to the second terminal of the first p-channel transfer transistor P2, to the second terminal of the first pull-up transistor P1 and to the second terminal of the first pull-down transistor N2, and the second non-inverted carry output $C1_{1a}$ is connected to a second terminal of a second n-channel transfer transistor N3, to a second terminal of the second p-channel transfer transistor P4, to a second terminal of the second pull-up transistor P3 as well as to a second terminal of the second pull-down transistor N4. The block carry input $BL_{1e}$ simultaneously forms the block carry output $BL_{1a}$ and is interconnected via a third inverter I7 to a second OR input of the ORNAND gate ORNAND1. The output of the ORNAND gate ORNAND1 is connected to the gate terminals of the third p-channel transfer transistor P6 and the third n-channel transfer transistor N6 as well as to a first terminal of a fourth p-channel transfer transistor P5 and a first terminal of a fourth n-channel transfer transistor N5. The output of the second NAND gate NAND2 is connected to a first terminal of the third p-channel transfer transistor P6 and, via a fourth inverter I3, to a first terminal of the third n-channel transfer transistor N6 and to a gate terminal of the fourth n-channel transfer transistor N5. Further, the output of the second NAND gate NAND2 is connected to the gate terminal of the fourth p-channel transfer transistor P5 and the sum output S1 is connected via a fifth inverter I4 to a second terminal of the third and a second terminal of the fourth p-channel transfer transistor P6, P5, respectively, and to the second terminals of the third and fourth n-channel transfer transistors N6, N5.

Figure 4:
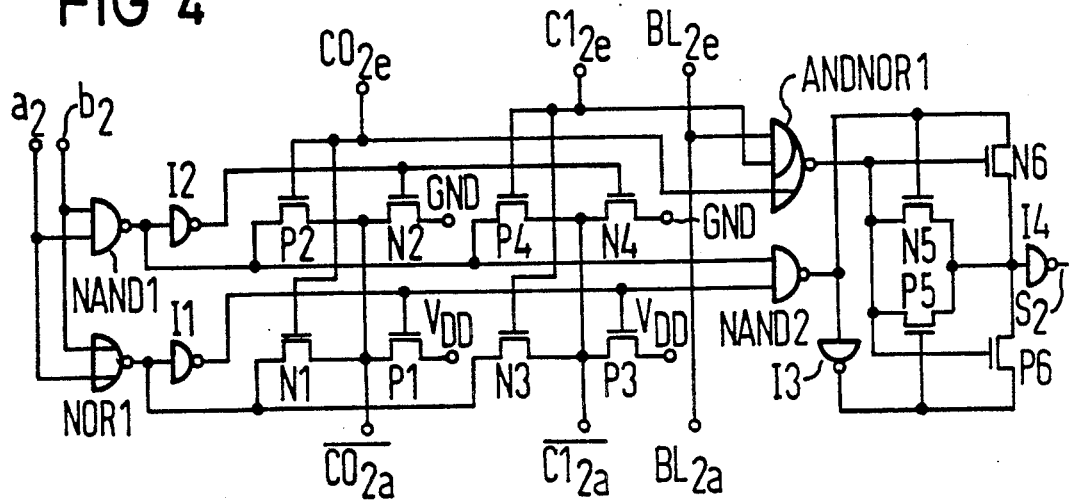
FIG. 4 is a circuit diagram of an adder cell of the second type in FIG. 1.

FIG. 4 shows a block circuit diagram of an adder cell of the second type. This cell includes a gate arrangement for two variables for evaluating a first and second carry input signal, for sum formation and for carry formation, with a variable input provided for one of the two variables.

The gate arrangement of the adder cell of the second type is designed such that the charging of the capacitor of the first and second, inverted carry outputs $C0_{2a}$, $C1_{2a}$ occurs via two field effect transistors P1, N2 acting as pull-up transistors for $C0_{2a}$, and P3, N4 acting as pull-up transistors for $C1_{2a}$. Pull-down occurs from two transfer transistors N1, P2 for the first inverted carry output $C0_{2a}$ and N3, P4 for the second inverted carry output $C1_{2a}$.

The adder cell of the second type is similarly constructed with components identical to those found in the input adder cell of FIG. 2 or the adder cell of the first type according to FIG. 3, so that identical references characters are utilized in FIG. 4, FIG. 3 and FIG. 2. The adder cell of the second type is composed of two NAND gates NAND1, NAND2, a NOR gate NOR1, an ANDNOR gate ANDNOR1, four inverters I1, I2, I3, I4, six n-channel field effect transistors N1, N2, N3, N4, N5, N6, as well as six p-channel field effect transistors P1, P2, P3, P4, P5, P6. Just as in the adder cell of the first type according to FIG. 3, the p-channel field effect transistors P1, P3 are utilized as pull-up transistors, the n-channel field effect transistors N2, N4 are utilized as pull-down transistors and the remaining field effect transistors are utilized as transfer transistors.

The first variable input $a_2$ is connected to the first input of a first NAND gate NAND1 and to the first input of the NOR gate NOR1, whereas the second variable input $b_2$ is interconnected to the second input of the first NAND gate NAND1 and to the second input of the NOR gate NOR1. The output of the first NAND gate NAND1 is connected via a first inverter I2 to the gate terminals of the first and second pull-down transistor N2, N4, respectively. The output of the first NAND gate NAND1, is interconnected to a first terminal of a first p-channel transfer transistor P2 and to a first terminal of a second p-channel transfer transistor P4 as well as to a first terminal of the second NAND gate NAND2. The output of the NOR gate NOR1 is connected via a second inverter I1 to the gate terminals of the first and second pull-up transistors P1, P3 and to a second input of the NAND gate NAND2.

The output of the NOR gate NOR1 is also connected to the first terminal of the first and second n-channel transfer transistor N1, N3. The first terminals of the first and second pull-up transistors P1, P3 are connected to the supply voltage $V_{DD}$ and the first terminal of the first and second pull-down transistors N2, N4 are connected to the ground GND. The first non-inverted carry input $C0_{2e}$ is interconnected to the gate terminal of the first p-channel transfer transistor P2, the gate of the first n-channel transfer transistor N1 as well as to an OR input of the ANDNOR gate ANDNOR1. The second non-inverted carry input $C1_{2e}$ is interconnected to the gate terminal of the second p-channel transfer transistor P4, the gate terminal of the second n-channel transfer transistor N3 as well as to a first AND input of the ANDNOR gate ANDNOR1. The block carry input $BL_{2e}$ simultaneously forms the block carry output $BL_{2a}$ of the adder cell of the second type and is simultaneously connected to a second AND input of the ANDNOR gate ANDNOR1. The first inverted carry output $C0_{2a}$ is interconnected to a second terminal of the first p-channel transfer transistor P2, the second terminal of the first n-channel transfer transistor N1, the first terminal of the first pull-down transistor N2 and the first terminal of the first pull-up transistor P1.

The second inverted carry output $C1_{2a}$ is interconnected to the second terminal of the second p-channel transfer transistor P4, the second terminal of the second n-channel transfer transistor N3, the first terminal of the second pull-down transistor N4, and the first terminal of the second pull-up transistor P3. The output of the ANDNOR gate ANDNOR1 is connected to the gate terminal of the third n-channel transfer transistor N6, the gate terminal of the third p-channel transfer transistor P6, a first terminal of the fourth n-channel transfer transistor N5 and to the first terminal of the fourth p-channel transfer transistor P5. The output of the second NAND gate NAND2 is interconnected to a first terminal of the third n-channel transfer transistor N6, the gate terminal of the fourth n-channel transfer transistor N5 via a third inverter I3, to the gate terminal of the fourth p-channel transfer transistor P5 and to the first terminal of the third p-channel transfer transistor P6. The sum output $S_2$ is connected via a fourth inverter I4 to the second terminals of the third and fourth n-channel transfer transistors N6, N5 and to the second terminals of the third and fourth p-channel transfer transistor P5, P6.

In the design of the adder cells of the first and second type, the pull-up transistors P1, P3 or the pull-down transistors N2, N4 and the transfer transistors N1, N3 or P2, P4 are not a component part of a combination gate within the gate arrangement. This is done so that transfer transistors that are in a time-critical transmission path are optimized and will generate low capacitance for the preceding stage but will always exhibit low source-to-drain impedance.

The input adder cell and the adder cell of the second type are identically constructed for the most part; however, all transfer transistors or pull-up and pull-down transistors N1, N2, N3, N4, P1, P2, P3, P4 are omitted. The carry signals at the non-inverted carry inputs $C0_{0e}$ and $C1_{0e}$ and block carry input $BL_{0e}$ of the input adder cell are connected directly to the inputs of the ANDNOR1 gate for the calculation of the new block carry signal. Therefore, the input adder cell requires no transfer transistors and the carry signals at the inverted first and second carry output $C0_{0a}$, $C0_{0a}$ are determined only by the variable inputs $a_0$, $b_0$.

The transfer transistors P2, N1 or P4, N3 in the adder cells of the first and second type have functional jobs, whereas the pull-up or pull-down transistors P1, P3 or N2, N4 are intended for a better transmission of the supply voltage $V_{DD}$, improved path to ground GND, and better transmission to the first and second carry outputs.

In the input adder cell, the ANDNOR gate ANDNOR1 serves for the determination of a new block carry signal, in contrast to the ANDNOR gate ANDNOR1 in the adder cell of the second type. Also, the block carry signal in the remaining adder cells of an adder block is held at a constant level.

The input adder cell and the adder cells of the first and second type share a variable input part composed of an NAND gate NAND1 and NOR gate NOR1. In both the input and the remaining adder cells, the carry signals at the two carry inputs and the block signal at the block carry input are evaluated to form a sum output. The sum of the variable inputs via the ANDNOR gate ANDNOR1 or the ORNAND gate ORNAND1 are then forwarded to the corresponding sum output.

Although modifications and changes may be suggested by those skilled in the art, it is the intention of the inventors to embody within the patent warranted hereon all changes and modifications as reasonably and properly come within their contribution to the art.

We claim as our invention:

1. A carry-select adder comprising:
   first adder cell means for providing first and second inputs, first and second carry inputs, a block carry input, first and second inverted carry outputs, a block carry output, and a sum output, said first adder cell means including a plurality of first adder cells;
   second adder cell means for providing first and second inputs, first and second inverted carry inputs, a block carry input, first and second carry outputs, a block carry output, and a sum output, said second adder cell means including a plurality of second adder cells;
   input adder cell means for providing first and second carry inputs, a block carry input, first and second inverted carry outputs, a block carry output, and a sum output;
   a plurality of sequentially arranged blocks, each block having a first stage and a second stage;
   said first stage of each block including said input adder cell means and one of said second adder cells of said second adder cell means, said first and second inverted carry outputs of said input adder means being respectively connected to said first and second inverted carry inputs of said one of said second adder cells of said second adder means, said block carry output of said input adder means being connected to said block carry input of said one of said adder cells of said second adder means, wherein said input adder cell means provides first and second carry inputs and a block carry input for each of said blocks;
   said second stage of each block including a plurality of said first adder cells of said first adder cell means arranged in an alternating sequence with a plurality of said second adder cells of said second adder cell means, said sequence beginning with one of said first adder cells, and each of said first and second adder cells of said second stage having said first and second inverted carry outputs of said first adder cells respectively connected to said first and second inverted carry inputs of said second adder cells, said first and second carry outputs of said second adder cells respectively connected to said first and second carry inputs of said first adder cells, and said block carry outputs of said first adder cells connected to said block carry inputs of said second adder cells, said sequence ending with a predetermined one of said second adder cells, wherein said predetermined one of said second adder cells provides first and second carry outputs and a block carry output for each of said blocks; and said first and second carry outputs of said one of said second adder cells of said first stage being connected to said first and second carry inputs of said one of said first adder cells of said second stage, and said block carry output of said one of said second adder cells of said first stage being connected to said block carry input of said one of said first adder cells of said second stage.

2. The carry-select adder of claim 1, wherein said input adder cell means comprises:

an input adder cell including a first NAND gate having a first gate input connected to a first input of said input adder cell, and a second gate input of said first NAND gate connected to a second input of said input adder cell, a NOR gate having a first gate input connected to said first input of said input adder cell, and a second gate input connected to said second input of said input adder cell, an output of said first NAND gate forming a first inverted carry output and being connected to a first input of a second NAND gate, an output of said NOR gate forming a second inverted carry output and connected to a second input of said second NAND gate via a first inverter, a first carry input connected to a NOR input of an ANDNOR gate, and a second carry input and a clock carry input respectively connected to first and second inputs of said ANDNOR gate, an output of said ANDNOR gate forming a block carry output for said input adder cell via a second inverter, said output of said ANDNOR gate further connected to a gate of a first p-channel field effect transistor via a third inverter, to a gate of a first n-channel field effect transistor, and to a first terminal of a second p-channel field effect transistor, and to a first terminal of a second n-channel field effect transistor, the output of said second NAND gate connected to a gate of said second p-channel field effect transistor, to a gate of said second n-channel field effect transistor, to a gate of said second n-channel field effect transistor via a fourth inverter, a second terminal of said first n-channel field effect transistor, a second terminal of said second n-channel field effect transistor, a second terminal of said first p-channel field effect transistor and a second terminal of said second p-channel field effect transistor, each connected to an input of a fifth inverter, and an output of said fifth inverter forming said sum output of said input adder cell.

3. The carry-select adder of claim 1, wherein said first adder cell means comprises:

a plurality of first adder cells, each of said first adder cells including a first NAND gate having a first gate input connected to a first input of said first adder cells and a second gate input of said first NAND gate connected to a second input of said first adder cells, a NOR gate having a first gate input connected to said first input of said first adder cells and a second gate input of said NOR gate connected to said second input of said first adder cells, an output of said first NAND gate connected via a first inverter to a first terminal of a first n-channel field effect transistor and to a first terminal of a second n-channel field effect transistor, said first inverter, said first n-channel field effect transistor, and said second n-channel field effect transistor forming a series circuit, an output of said first NAND gate connected to a first input of a second NAND gate, to a gate terminal of a first p-channel field effect transistor, and to a gate terminal of a second p-channel field effect transistor, a first terminal of said first p-channel field effect transistor, and a first terminal of said second p-channel field effect transistor connected to a supply voltage, an output of said NOR gate connected via a second inverter to a first terminal of a third p-channel field effect transistor and to a first terminal of a fourth p-channel field effect transistor, said first terminal of said fourth p-channel field effect transistor connected to a second input of said second NAND gate, an output of said NOR gate connected to a gate terminal of and third and fourth n-channel field effect transistors, a first terminal of said third and fourth n-channel field effect transistors connected to ground, a first inverted carry input connected to a gate terminal of said first n-channel field effect transistor, a gate terminal of said third p-channel field effect transistor, and to a NAND input of an ORNAND gate, a second inverted carry input connected to a gate terminal of said second n-channel field effect transistor, a gate terminal of said fourth p-channel field effect transistor, and to a first OR input of said ORNAND gate, a first carry output connected to a second terminal of said first n-channel field effect transistor, a second terminal of said first p-channel field effect transistor, a second terminal of said third p-channel field effect transistor, and a second terminal of said third n-channel field effect transistor, a second carry output connected to a second terminal of said second n-channel field effect transistor, a second terminal of said second p-channel field effect transistor, a second terminal of said fourth p-channel field effect transistor, and a second terminal of said fourth n-channel field effect transistor, a block carry input, connected to a block carry output, and further connected via a third inverter to a second OR input of said ORNAND gate, an output of the ORNAND gate connected to a gate terminal of a fifth p-channel field effect transistor, a gate terminal of a fifth n-channel field effect transistor, a first terminal of a sixth p-channel field effect transistor, and a first terminal of a sixth n-channel field effect transistor, an output of said second NAND gate connected to a first terminal of said fifth p-channel field effect transistor, a gate terminal of said sixth p-channel field effect transistor, a first terminal of said fifth n-channel field effect transistor via a fourth inverter, a gate terminal of said sixth n-channel field effect transistor via a fourth inverter, and a sum output connected via a fifth inverter to a second terminal of said fifth p-channel field effect transistor, a second terminal of said sixth p-channel field effect transistor, a second terminal of said fifth n-channel field effect transistors, and to a second terminal of said sixth n-channel field effect transistor.

4. The carry-select adder of claim 1, wherein said second adder cell means comprises:

a plurality of second adder cells, each of said second adder cells including a first NAND gate having a first gate input connected to a first input of said second adder cells and a second gate input of said first NAND gate connected to a second input of said second adder cells, a NOR gate having a first gate input connected to said first input of each of said second adder cells and a second gate input of said NOR gate connected to said second input of each of said second adder cells, an output of said first NAND gate connected to a gate terminal of a first n-channel field effect transistor via a first inverter, and to gate terminal of a second n-channel field effect transistor via said first inverter, said output of said first NAND gate connected to a first terminal of first p-channel field effect transistor, a first terminal of a second p-channel field effect transistor, and a first terminal of a second NAND gate, a first terminal of said first n-channel field effect transistor and a first terminal of said second n-channel field effect transistor each connected to ground, an output of said NOR gate connected to a gate terminal of a third p-channel field effect transistor via a second inverter, to a gate terminal of a fourth p-channel field effect transistors via a second inverter, and to a second input of said second NAND gate, said output of said NOR gate further connected to a first terminal of a third n-channel field effect transistor, and a first terminal of a fourth n-channel field effect transistor, said first terminal of said third p-channel field effect transistor and said first terminal of said fourth p-channel field effect transistor each connected to a supply voltage, a first carry input connected to a gate terminal of said first p-channel field effect transistor, a gate terminal of said third n-channel field effect transistor, and to a first NOR input of an ANDNOR gate, a secondary carry input connected to a gate terminal of said second p-channel field effect transistor, a gate terminal of said fourth n-channel field effect transistor, and to a first AND input of said ANDNOR gate, a block carry input connected to a second AND input of said ANDNOR gate, forming a block carry output, a first inverted carry output connected to a second terminal of said first p-channel field effect transistor, a second terminal of said first n-channel field effect transistor, a second terminal of said third p-channel field effect transistor and to a first terminal of said third n-channel field effect transistor, a second inverted carry output connected to a second terminal of said second p-channel field effect transistor, a second terminal of said second n-channel field effect transistor, a second terminal of said fourth n-channel field effect transistor, and to a second terminal of said fourth p-channel field effect transistor, an output of said ANDNOR gate connected to a gate terminal of a fifth n-channel field effect transistor, a gate terminal of a fifth p-channel field effect transistor, a first terminal of a sixth n-channel field effect transistor, and a first terminal of a sixth p-channel field effect transistor, an output of said second NAND gate connected to a first terminal of said fifth n-channel field effect transistor, a gate terminal of said sixth n-channel field effect transistor, the gate terminal of said sixth p-channel field effect transistor via a third inverter, and to a first terminal of said fifth p-channel field effect transistor via an inverter, a sum output connected via a fourth inverter to a second terminal of said fifth n-channel field effect transistor, a second terminal of said sixth n-channel fifth p-channel field effect transistor and to a second terminal of said sixth p-channel field effect transistor.

5. The carry-select adder of claim 1, wherein said block carry input and said first and second carry inputs of said input adder cell means of said first block are set to a low logic state.

6. A carry-select adder comprising:

first adder cell means for providing first and second inputs, first and second carry inputs, a block carry input, first and second inverted carry outputs, a block carry output, and a sum output, said first adder cell means including a plurality of first adder cells;

second adder cell means for providing first and second inputs, first and second inverted carry inputs, a block carry input, first and second carry outputs, a block carry output, and a sum output, said second adder cell means including a plurality of second adder cells;

an input adder cell including a first NAND gate having a first gate input connected to a first input of said input adder cell, and a second gate input of said first NAND gate connected to a second input of said input adder cell, a NOR gate having a first gate input connected to said first input of said input adder cell, and a second gate input connected to said second input of said input adder cell, an output of said first NAND gate forming a first inverted carry output and being connected to a first input of a second NAND gate, an output of said NOR gate forming a second inverted carry output and connected to a second input of said second NAND gate via a first inverter, a first carry input connected to a NOR input of an ANDNOR gate, and a second carry input and a clock carry input respectively connected to first and second inputs of said ANDNOR gate, an output of said ANDNOR gate forming a block carry output for said input adder cell via a second inverter, said output of said ANDNOR gate further connected to a gate of a first p-channel field effect transistor via a third inverter, to a gate of a first n-channel field effect transistor, to a first terminal of a second p-channel field effect transistor, and to a first terminal of a second p-channel field effect transistor, the output of said second NAND gate connected to a gate of said second p-channel field effect transistor, to a gate of said second n-channel field effect transistor, to a gate of said second n-channel field effect transistor via a fourth inverter, a second terminal of said first n-channel field effect transistor, a second terminal of said second n-channel field effect transistor, a second terminal of said first p-channel field effect transistor and a second terminal of said second p-channel field effect transistor, each connected to an input of a fifth inverter, and an output of said fifth inverter forming said sum output of said input adder cell;

a plurality of sequentially arranged blocks, each block having a first stage and a second stage;

said first stage of each block including said input adder cell means and one of said second adder cells of said second adder cell means, said first and second inverted carry output of said input adder means being respectively connected to said first and second inverted carry inputs of said one of said second adder cells of said second adder means, said block carry output of said input adder means being connected to said block carry input of said one of said adder cells of said second adder means, wherein said input adder cell means provides first and second carry inputs and a block carry input for each of said blocks;

said second stage of each block including a plurality of said first adder cells of said first adder cell means arranged in an alternating sequence with a plurality of said second adder cells of said second adder cell means, said sequence beginning with one of said first adder cells, and each of said first and second adder cells of said second stage having said first and second inverted carry outputs of said first adder cells respectively connected to said first and second inverted carry inputs of said second adder cells, said first and second carry outputs of said second adder cells respectively connected to said first and second carry inputs of said first adder cells, and said block carry outputs of said first adder cells connected to said block carry inputs of said second adder cells, said sequence ending with a predetermined one of said second adder cells, wherein said predetermined one of said second adder cells provides first and second carry outputs and a block carry output for each of said blocks; and said first and second carry outputs of said one of said second adder cells of said first stage being connected to said first and second carry inputs of said one of said first adder cells of said second stage, and said block carry output of said one of said second adder cells of said first stage being connected to said block carry input of said one of said first adder cells of said second stage.

7. The carry-select adder of claim 6, wherein said first and second inputs of said input adder cell of said first block and said block carry input of said input adder cell of said first block are set to a low logic state.

8. A carry-select adder comprising:

a plurality of first adder cells, each of said first adder cells including a first NAND gate having a first gate input connected to a first input of said first adder cells and a second gate input of said first NAND gate connected to a second input of said first adder cells, a NOR gate having a first gate input connected to said first input of said first adder cells and a second gate input of said NOR gate connected to said second input of said first adder cells, an output of said first NAND gate connected via a first inverter to a first terminal of a first n-channel field effect transistor and to a first terminal of a second n-channel field effect transistor, said first inverter, said first n-channel field effect transistor, and said second n-channel field effect transistor forming a series circuit, an output of said first NAND gate connected to a first input of a second NAND gate, to a gate terminal of a first p-channel field effect transistor, and to a gate terminal of a second p-channel field effect transistor, a first terminal of said first p-channel field effect transistor, and a first terminal of said second p-channel field effect transistor connected to a supply voltage, an output of said NOR gate connected via a second inverter to a first terminal of a third p-channel field effect transistor and to a first terminal of a fourth p-channel field effect transistor, said first terminal of said fourth p-channel field effect transistor connected to a second input of said second NAND gate, an output of said NOR gate connected to a gate terminal of and third and fourth n-channel field effect transistors, a first terminal of said third and fourth n-channel field effect transistors connected to ground, a first inverted carry input connected to a gate terminal of said first n-channel field effect transistor, a gate terminal of said third p-channel field effect transistor, and to a NAND input of an ORNAND gate, a second inverted carry input connected to a gate terminal of said second n-channel field effect transistor, a gate terminal of said fourth p-channel field effect transistor, and to a first OR input of said ORNAND gate, a first carry output connected to a second terminal of said first n-channel field effect transistor, a second terminal of said first p-channel field effect transistor, a second terminal of said third p-channel field effect transistor, and a second terminal of said third n-channel field effect transistor, a second carry output connected to a second terminal of said second n-channel field effect transistor, a second terminal of said second p-channel field effect transistor, a second terminal of said fourth p-channel field effect transistor, and a second terminal of said fourth n-channel field effect transistor, a block carry input, connected to a block carry output, and further connected via a third inverter to a second OR input of said ORNAND gate, an output of the ORNAND gate connected to a gate terminal of a fifth p-channel field effect transistor, a gate terminal of a fifth n-channel field effect transistor, a first terminal of a sixth p-channel field effect transistor, and a first terminal of a sixth n-channel field effect transistor, an output of said second NAND gate connected to a first terminal of said fifth p-channel field effect transistor, a gate terminal of said sixth p-channel field effect transistor, a first terminal of said fifth n-channel field effect transistor via a fourth inverter, a gate terminal of said sixth n-channel field effect transistor via a fourth inverter, and a sum output connected via a fifth inverter to a second terminal of said fifth p-channel field effect transistor, a second terminal of said sixth p-channel field effect transistor, a second terminal of said fifth n-channel field effect transistors, and to a second terminal of said sixth n-channel field effect transistor;

second adder cell means for providing first and second inputs, first and second inverted carry inputs, a block carry input, first and second carry outputs, a block carry output, and a sum output, said second adder cell means including a plurality of second adder cells;

input adder cell means for providing first and second carry inputs, a block carry input, first and second inverted carry outputs, a block carry output, and a sum output;

a plurality of sequentially arranged blocks, each block having a first stage and a second stage;

said first stage of each block including said input adder cell means and one of said second adder cells of said second adder cell means, said first and second inverted carry outputs of said input adder means being respectively connected to said first and second inverted carry inputs of said one of said second adder cells of said second adder means, said block carry output of said input adder means being connected to said block carry input of said one of said adder cells of said second adder means, wherein said input adder cell means provides first and second carry inputs and a block carry input for each of said blocks;

said second stage of each block including a plurality of said first adder cells of said first adder cell means arranged in an alternating sequence with a plurality of said second adder cells of said second adder cell means, said sequence beginning with one of said first adder cells, and each of said first and second adder cells of said second stage having said first and second inverted carry outputs of said first adder cells respectively connected to said first and second inverted carry inputs of said second adder cells, said first and second carry outputs of said second adder cells respectively connected to said first and second carry inputs of said first adder cells, and said block carry outputs of said first adder cells connected to said block carry inputs of said second adder cells, said sequence ending with a predetermined one of said second adder cells, wherein said predetermined one of said second adder cells provides first and second carry outputs and a block carry output for each of said blocks; and said first and second carry outputs of said one of said second adder cells of said first stage being connected to said first and second carry inputs of said one of said first adder cells of said second stage, and said block carry output of said one of said second adder cells of said first stage being connected to said block carry input of said one of said first adder cells of said second stage.

9. The carry-select adder of claim 8, wherein said block carry input and said first and second system carry inputs of said input adder cell means of said first block are set to a low logic state.

10. A carry-select adder comprising:

first adder cell means for providing first and second inputs, first and second carry inputs, a block carry input, first and second inverted carry outputs, a block carry output, and a sum output, said first adder cell means including a plurality of first adder cells;

a plurality of second adder cells, each of said second adder cells including a first NAND gate having a first gate input connected to a first input of said second adder cells and a second gate input of said first NAND gate connected to a second input of said second adder cells, a NOR gate having a first gate input connected to said first input of each of said second adder cells and a second gate input of said NOR gate connected to said second input of each of said second adder cells, an output of said first NAND gate connected to a gate terminal of a first n-channel field effect transistor via a first inverter, and to gate terminal of a second n-channel field effect transistor via said first inverter, said output of said first NAND gate connected to a first terminal of first p-channel field effect transistor, a first terminal of a second p-channel field effect transistor, and a first terminal of a second NAND gate, a first terminal of said first n-channel field effect transistor and a first terminal of said second n-channel field effect transistor each connected to ground, an output of said NOR gate connected to a gate terminal of a third p-channel field effect transistor via a second inverter, to a gate terminal of a fourth p-channel field effect transistors via a second inverter, and to a second input of said second NAND gate, said output of said NOR gate further connected to a first terminal of a third n-channel field effect transistor, and a first terminal of a fourth n-channel field effect transistor, said first terminal of said third p-channel field effect transistor and said first terminal of said fourth p-channel field effect transistor each connected to a supply voltage, a first carry input connected to a gate terminal of said first p-channel field effect transistor, a gate terminal of said third n-channel field effect transistor, and to a first NOR input of an ANDNOR gate, a secondary carry input connected to a gate terminal of said second p-channel field effect transistor, a gate terminal of said fourth n-channel field effect transistor, and to a first AND input of said ANDNOR gate, a block carry input connected to a second AND input of said ANDNOR gate, forming a block carry output, a first inverted carry output connected to a second terminal of said first p-channel field effect transistor, a second terminal of said first n-channel field effect transistor, a second terminal of said third p-channel field effect transistor and to a first terminal of said third n-channel field effect transistor, a second inverted carry output connected to a second terminal of said second p-channel field effect transistor, a second terminal of said second n-channel field effect transistor, a second terminal of said fourth n-channel field effect transistor, and to a second terminal of said fourth p-channel field effect transistor, an output of said ANDNOR gate connected to a gate terminal of a fifth n-channel field effect transistor, a gate terminal of a fifth p-channel field effect transistor, a first terminal of a sixth n-channel field effect transistor, and a first terminal of a sixth p-channel field effect transistor, an output of said second NAND gate connected to a first terminal of said fifth n-channel field effect transistor, a gate terminal of said sixth n-channel field effect transistor, the gate terminal of said sixth p-channel field effect transistor via a third inverter, and to a first terminal of said fifth p-channel field effect transistor via an inverter, a sum output connected via a fourth inverter to a second terminal of said fifth n-channel field effect transistor, a second terminal of said sixth n-channel fifth p-channel field effect transistor and to a second terminal of said sixth p-channel field effect transistor;

input adder cell means for providing first and second carry inputs, a block carry input, first and second inverted carry outputs, a block carry output, and a sum output;

a plurality of sequentially arranged blocks, each block having a first stage and a second state;

said first stage of each block including said input adder cell means and one of said second adder cells of said second adder cell means, said first and second inverted carry outputs of said input adder means being respectively connected to said first and second inverted carry inputs of said one of said second adder cells of said second adder means, said block carry output of said input adder means being connected to said block carry input of said one of said adder cells of said second adder means, wherein said input adder cell means provides first and second carry inputs and a block carry input for each of said blocks;

said second stage of each block including a plurality of said first adder cells of said first adder cell means arranged in an alternating sequence with a plurality of said second adder cells of said second adder cell means, said sequence beginning with one of said first adder cells, and each of said first and second adder cells of said second stage having said first and second inverted carry outputs of said first adder cells respectively connected to said first and second inverted carry inputs of said second adder cells, said first and second carry outputs of said second adder cells respectively connected to said first and second carry inputs of said first adder cells, and said block carry outputs of said first adder cells connected to said block carry inputs of said second adder cells, said sequence ending with a predetermined one of said second adder cells, wherein said predetermined one of said second adder cells provides first and second carry outputs and a block carry output for each of said blocks; and said first and second carry outputs of said one of said second adder cells of said first stage being connected to said first and second carry inputs of said one of said first adder cells of said second stage, and said block carry output of said one of said second adder cells of said first stage being connected to said block carry input of said one of said first adder cells of said second stage.

11. The carry-select adder of claim 10, wherein said block carry input and said first and second system carry inputs of said input adder cells means of said first block are set to a low logic state.

* * * * *